United States Patent [19]

Jasinaki

[11] Patent Number: 5,070,329
[45] Date of Patent: Dec. 3, 1991

[54] ON-SITE COMMUNICATION SYSTEM WITH RF SHIELDING HAVING PAGER IDENTIFICATION CAPABILITY

[75] Inventor: Leon Jasinaki, Ft. Lauderdale, Fla.
[73] Assignee: Motorola, Inc., Schaumburg, Ill.
[21] Appl. No.: 445,259
[22] Filed: Dec. 4, 1989
[51] Int. Cl.$^5$ ............................................. H04B 7/00
[52] U.S. Cl. ........................ 340/825.44; 340/825.49; 340/311.1
[58] Field of Search ...................... 340/311.1, 539, 541, 340/545, 549, 573, 825.44, 825.49, 825.54; 379/56, 57; 455/32, 38, 343, 63, 300; 174/35 MS

[56] References Cited

U.S. PATENT DOCUMENTS

| | | | |
|---|---|---|---|
| 4,598,275 | 7/1986 | Ross et al. | 340/573 |
| 4,649,385 | 3/1987 | Aries et al. | 379/57 |
| 4,740,788 | 4/1988 | Konnecker | 379/57 |
| 4,752,951 | 6/1988 | Konnecker | 340/825.49 |
| 4,811,379 | 5/1989 | Grandfield | 379/57 |
| 4,814,751 | 3/1989 | Hawkins et al. | 340/573 |
| 4,837,568 | 6/1989 | Snaper | 340/825.54 |
| 4,894,489 | 1/1990 | Takahashi et al. | 174/35 MS |
| 4,918,431 | 4/1990 | Borras | 340/825.44 |
| 4,941,207 | 7/1990 | Maeda et al. | 455/300 |

FOREIGN PATENT DOCUMENTS

| | | | |
|---|---|---|---|
| 0026883 | 2/1986 | Japan | 340/573 |
| 2076608 | 12/1981 | United Kingdom | 340/573 |
| 8904031 | 5/1989 | World Int. Prop. O. | 340/573 |

OTHER PUBLICATIONS

Motorola Message Center System Overview, publication No. RO-5-139A copyright 12-1988 by Motorola, Inc., Schaumburg, Ill.

Primary Examiner—Donald J. Yusko
Assistant Examiner—Dervis Magistre
Attorney, Agent, or Firm—Philip P. Macnak; Vincent B. Ingrassia; William E. Koch

[57] ABSTRACT

An on-site communication system includes a system for identifying communication receivers including acknowledge back capability and operating within the on-site communication system, and for controlling the delivery of messages to the communication receivers. The identification system operates on the same frequency as the on-site communication system, and includes an RF shielded enclosure for momentarily shielding the communication receivers from messsages transmitted on the on-site communication system. The RF shielded enclosure provides interference free identification of the communication receivers as the communication receivers pass through the enclosure, and enables the determination of those communication receivers which are operating within the coverage area of the on-site communication system, and those communication receivers which have left the coverage area of the on-site communication system.

19 Claims, 6 Drawing Sheets

ON-SITE COMMUNICATION SYSTEM WITH RF SHIELDING HAVING PAGER IDENTIFICATION CAPABILITY

BACKGROUND OF THE INVENTION

1. Field of the Invention

This invention relates to on-site communication systems, and more particularly to an on-site communication system providing receiver identification capability.

2. Description of the Prior Art

There are many different communication systems in wide use today. These communication systems are broadly classified in terms of the type of service provided, such as wide area and on-site communication systems. As can be inferred from the classifications, wide area systems provide wide area coverage, such as for a complete metropolitan area, whereas on-site systems provide communication coverage for only a limited operating area, such as an office building or hospital complex and the immediately adjacent area. Such on-site communication systems, such as paging systems providing one way information transfer, generally provide such paging service for only the occupants or employees of the building or complex. Because the coverage area provided by such on-site paging systems is limited, the ability to provide reliable transmission of paging messages to the system users is complicated by the fact that some page recipients may periodically travel beyond the coverage area provided by the on-site system.

This problem is particularly true for some professionals, such as doctors who practice in one or more hospitals, and who also practice out of a private office at a medical plaza remotely located from the hospitals. Various doctors registry systems have been provided in hospitals and hospital complexes to track when a doctor is within the facility, and consequently capable of being contacted with the on-site paging system, and when the doctor has left the facility. These prior art systems include such methods as manual entry of the doctors presence on a daily log by a guard or receptionist, manual entry by a receptionist or the doctor of their status through the use of a keypad or computer terminal, and the use by the doctors of coded cards readable by card readers. Such prior art systems which rely on such manual intervention has proven to be less than fully reliable because of problems associated with having to regularly check into and out of the hospital complex, especially in times of emergency. In those instances where the doctor fails to check in, or where the doctor fails to check out, the reliability of message transmission using the on-site paging system can become degraded substantially, and in those instances where an emergency may arise, could result in a life threatening situation.

A system is required which will allow automatically tracking the presence of a pager user, such as the doctor, when the user is within range of the on-site communication system, and when the user is outside the range of the on-site communication system. Such a system would greatly enhance the ability of the on-site communication system to reliably deliver messages.

SUMMARY OF THE INVENTION

It is an object of the present invention to provide an on-site communication system having means to automatically identify the presence of a system user within the coverage area provided by the on-site communication system.

It is a further object of the present invention to provide an on site communication system which is capable of reliably delivering messages to the on-site communication system users.

An on-site communication system identification system includes an on-site transmitter operating on a predetermined frequency within a predetermined coverage area for the transmission of messages to a plurality of portable communication receivers including acknowledge back response capability. Each portable communication receiver is capable of receiving messages on the on-site communication system, and also capable of delivering an acknowledge back signal in response to a query signal. An enclosed entry area is provided allowing entry into the predetermined coverage area. The enclosed entry area includes RF shielding for shielding the portable communication receivers located therein from message transmissions from the on-site transmitter. A detector is provided within the enclosed entry area for detecting the presence of a portable communication receiver within the enclosed entry area. An identification transmitter is provided which is responsive to the detection of a portable communication receiver within the enclosed entry area to transmit the query signal on the predetermined frequency utilized by the on-site communication system. An identification receiver is provided to receive the acknowledge back signal generated by the portable communication receiver located within the enclosed entry area in response to the query signal. The acknowledge back response is encoded to identify each of the plurality of portable communication receivers in the system. The identification system is capable of automatically identifying entry into or exit from the coverage area of the on-site communication system. The on-site communication system will deliver messages to each of the portable communication receivers, when such receiver is within the range of the on-site communication system. The on-site communication system can further store messages intended for those portable communication receivers which have left the coverage area of the on-site communication system. For those portable communication receivers which are capable of operating on the on-site communication system, and an area wide communication system, the portable communication receiver may also be reprogrammed by the identification system to operate on the area wide communication system when they are leaving the coverage area of the on-site communication system, and vice versa.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
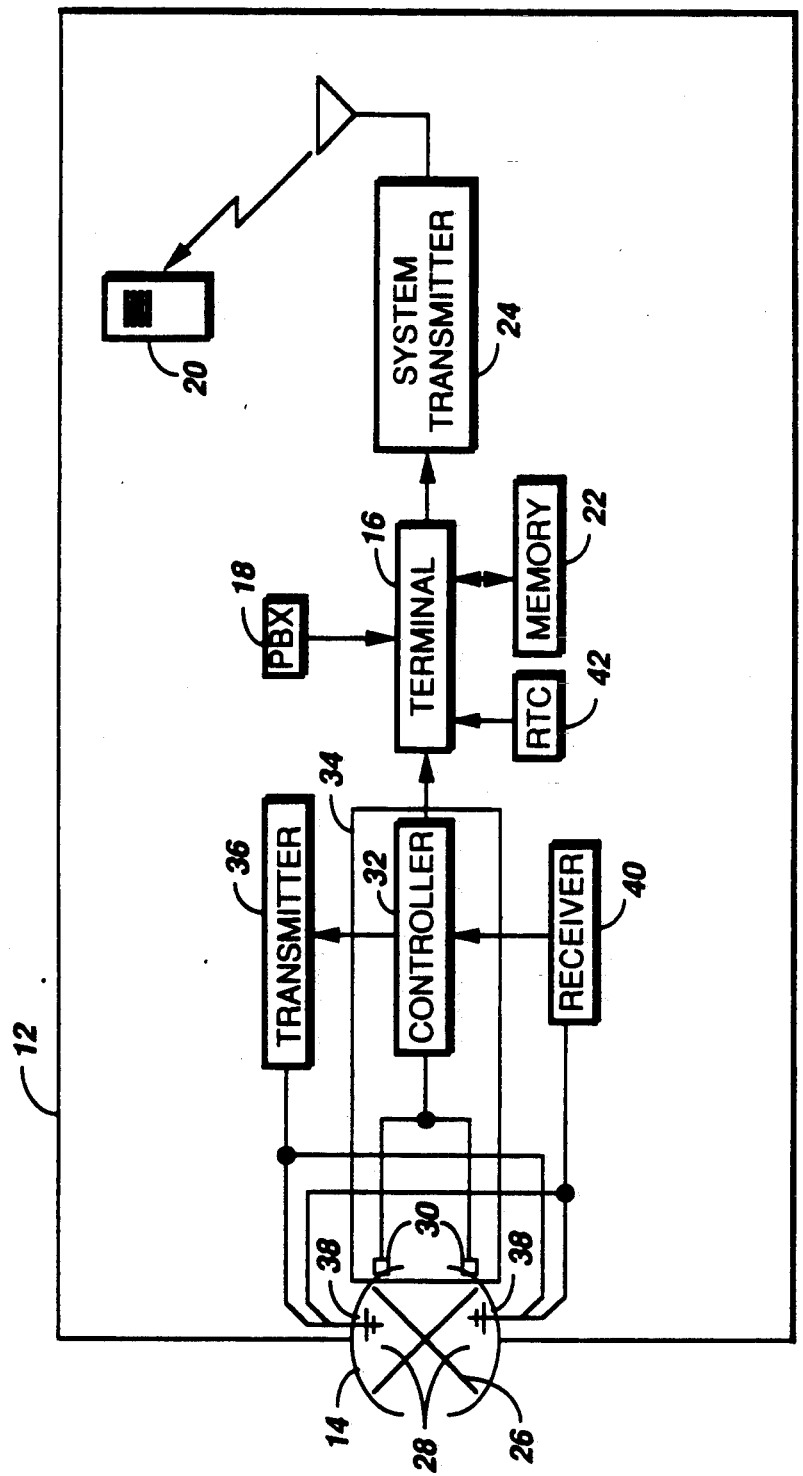
FIG. 1 is a block diagram of an on-site communication system having automatic portable communication receiver identification capability for the preferred embodiment of the present invention.

FIGS. 1 through 6 illustrate the preferred embodiment of the present invention, an on-site communication system providing automatic portable communication receiver identification capability. FIG. 1 is a block diagram of such an on-site communication system providing automatic portable communication receiver identification capability. As shown in FIG. 1, the on-site communication system 10, such as an on-site paging system, provides a coverage area 12 which can define a single building, an office complex, or other such structure having a limited number of entry locations 14, only one of which is shown. It will be appreciated most on-site communication systems of the type described have multiple entry locations, each of which would be configured as entry location 14 as in the description to follow.

The on-site paging system 10 of the present invention includes a terminal 16 which couples through a private branch exchange, PBX 18, or other form of input to the public switched telephone network. Terminal 16 receives and processes messages entered through the telephone network which are directed to any of a plurality of portable communication receivers, or pagers 20, only one of which is shown. The operation of terminal 16 in processing such message information is well known in the art. As the messages are received, the messages may be temporarily stored in memory 22 prior to being transmitted within the on-site coverage area 12 by system transmitter 24. In the preferred embodiment of the present invention, system transmitter 24 is a conventional frequency modulated (FM) transmitter which is well known in the art. It will be appreciated other forms of transmitter modulation may be suitable for use as well. Memory 22 utilizes any of a number of memory types suitable for the temporary storage of information, such as semiconductor random access memories (RAMs) and hard disk memories, or a combination thereof. Memory 22 also stores a subscriber list providing such information as pager address, and pager user status as will be described in detail below. While only a single transmitter is shown, it will be appreciated in large, or extended on-site communication systems, multiple transmitters may be required to provide sufficient system coverage. It will also be appreciated the coverage area of an on-site paging system will extend for some distance beyond the boundaries of the building, or structure itself.

Unlike a conventional on-site paging system, the on-site paging system 10 of the present invention includes apparatus to automatically identify whether a particular pager is in operation within the coverage area of the on-site paging system. As shown in FIG. 1, the on-site paging system of the present invention includes an entry point 14, which may be configured in any of a number of ways, as to be described for FIGS. 2A-2F. As shown in FIG. 1, a revolving door 26, which provides an enclosed entry means, is used to provide access, both entry into and egress from building 12. Revolving door 26 operates in a conventional manner; however, unlike a conventional revolving door, revolving door 26 along with the associated wall structure is constructed to provide an RF shielded enclosure, providing two RF shielded chambers 28 when the door is in the position shown. In the preferred embodiment of the present invention, the RF shielded enclosure provides at least 20 dB of isolation from the transmissions of on-site system transmitter 24. The shielding limits interference between the on site paging system and the pager identification portion of the system. Techniques to provide the required RF shielding are well known in the art, such as those used for RF shielded enclosures manufactured by Erik A. Lindgren and Associates, of Chicago, Ill.

Sensors 30, to be described in detail shortly, couple to a controller 32, which provides a detector means 34, used to detect when a pager is within the RF shielded chambers 28. In operation, when a pager user enters the building 12 through the entry door 26, the presence of the user with the pager is detected within one of the RF shielded chambers 28 by detector means 34. During the brief time interval the pager user is within the one of the RF shielded chambers 28, controller 32 keys identification transmitter 36, generating a short burst of unmodulated carrier at the same frequency as the on-site paging system transmitter 24. Transmitter 36 is a conventional FM modulated transmitter, which operates as a much lower power output level than the on-site paging system transmitter. The transmitter 36 carrier power is 5 watts or less, in the preferred embodiment of the present invention, as compared to a typical on-site transmitter power level of up to 100 watts. The transmitter 36 provides a query signal to initiate an acknowledge back response signal from the pager. The output of transmitter 36 couples to two antennas 38, one each positioned within one of the RF shielded chambers 28. Any of a number of well known antenna configurations, such as dipole and loop antenna configurations may be utilized to manufacture the antennas 38. In response to the query signal, the pager generates an acknowledge back signal which is intercepted by the antennas 38, which also couple to identification receiver 40. Receiver 40 is an AM receiver of the type to demodulate pulsed AM modulated signals, which is well known in the art. The acknowledge back signal generated is encoded with the address of the pager, thereby providing a positive identification of the pager within one of the RF shielded chambers 28. The output of receiver 40 is a serial stream of binary data representing the address of the responding pager. The receiver output couples through controller 32 to terminal 16 which processes the received information, storing an indication of the passage of the pager user through the entry in memory 22. Detector means 34, in the preferred embodiment of the present invention, is capable of detecting whether the pager user has entered into, or exited from, the building 12, and the information is then also stored in memory 22 along with the pager address by terminal 16. The pager location information derived from the passage of the pager through the entry door 14 is used to control message transmissions from the on-site paging system. When the stored location information indicates the pager, such as pager 20, is located within the building, messages directed to pager 20 are processed in a manner well known in the art by terminal 16, and transmitted to pager 20 by system transmitter 24. When the stored location information indicates the pager 20 has exited the building 12, messages directed to pager 20 are stored in memory 22 by terminal 16. When the presence of pager 20 is again detected within building 12, those messages which were stored for pager 20 are then delivered in a normal fashion. Terminal 16, in addition to storing the messages for pagers outside the building, can have voice prompting providing an audible indication to the message originator that the page message recipient has left the building, and as a consequence the message originator can have the option of storing the message, or deferring leaving a message.

In summary, an on-site paging system has been described having the capability of identifying when a portable communication receiver, or pager, is within the coverage area of the on-site system, as would normally be indicated by the pager being within building 12, or is outside the coverage area of the on-site system, as would normally be indicated by the pager being outside building 12. Messages intended for the pager are delivered in a normal fashion when the pager is within the building, and are stored when the pager is outside the building, being delivered when the pager re-enters the building. It will be appreciated the term building defines any area covered by the on-site paging system, and as such a large manufacturing facility having multiple entry points, and including any number of buildings and the surrounding terrain is considered a building in the context of this disclosure.

Figure 2A:
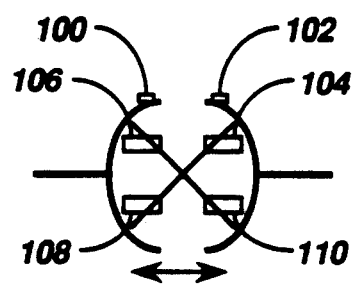
FIGS. 2A through 2D are pictorial representations showing alternate embodiments of the portable communication receiver detection methods for the on-site communication system having automatic identification capability for the preferred embodiment of the present invention.

The operation of the system to detect and determine the location of the pager is shown in FIGS. 2A-2D. In FIG. 2A, the shielded enclosure is formed using a rotating door as previously described. As, shown in FIG. 2A, the rotating door is capable of rotation in both directions. Two sensors 100, 102 are provided to detect rotation, or movement of the rotating door, thereby indicating the entry of a user through the door from either the inside of the building, or from the outside of the building. Sensors 100, 102 are preferably magnetically actuated reed relay type sensors which are well known in the art, although it will be appreciated other types of sensors performing the same function may be utilized as well such as infrared, ultrasonic, and mechanically actuated sensors. Four additional sensors 104, 106, 108, 110 are located, preferably on the floor of the entry enclosure, as shown. The floor mounted sensors, which may be carpet, or pad type pressure activated switch type sensors, which are well known in the art, are used to determine the presence of the pager user within the RF shielded enclosure and when pager user is entering or exiting the building. In particular, sensors 104, 106 are positioned so as to indicate the pager user is exiting the building, while sensors 108, 110 are position so as to indicate the pager user is entering the building. Sensors 104, 106, 108, 110 are positioned such that when they are activated, the revolving door has rotated sufficiently so as to provide the RF shielded chambers 28, previously described. During the time the pager user continues to rotate the door, the query signal is generated, and the acknowledge back response is received from the pager. The door motion sensor 100, 102 outputs, and the exit sensor 104, 106 and entry sensor 108, 110 outputs are monitored by the controller to determine the appropriate time to key the identification transmitter.

Figure 2B:
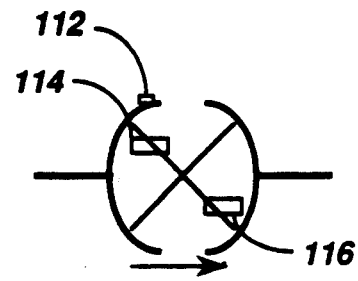
Figure 2C:
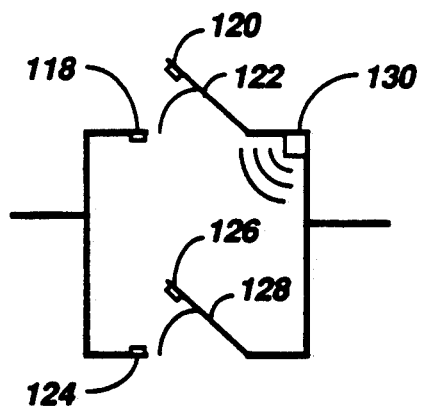

An alternate configuration for the sensors used with a revolving door are shown in FIG. 2B. As shown in FIG. 2B, the revolving door rotates only in one direction reducing the number of sensors required from six to three. As shown sensor 112 detects door motion, sensor 114 detects exiting from the building, and sensor 116 detects entrance into the building.

Where rotating doors are undesirable, the RF shielded enclosure may be constructed as shown in FIG. 2C. Shielding techniques for the enclosure configuration of FIG. 2C are also well known in the art. In the embodiment shown in FIG. 2C, a sensor 118 is provided to monitor the inside door 122, while sensor 124 is provided to monitor the outside door 128. Sensors 118 and 124 are preferably magnetically actuated reed relay switches, which are well known in the art, being actuated by magnets 120 and 126, respectively. In this instance the direction in which the pager user is moving is determined by which door opens first. When the inside door 122 opens first, this signifies the paging user is exiting the building, whereas when the outside door is actuated first, this signifies the pager user is entering the building. In this embodiment, the presence of the pager user within the RF shielded chamber is detected by an ultrasonic motion detector 130, which is well known in the art.

Figure 2D:
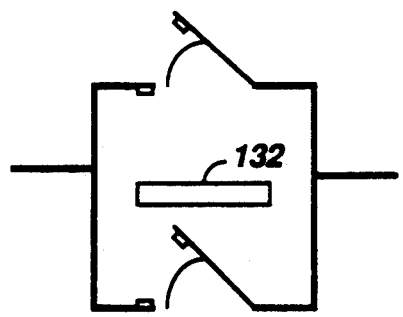

An alternate configuration for the sensors is shown in FIG. 2D. As shown in FIG. 2D, the presence of the pager user within the chamber is detected by the use of a pressure actuated floor mounted switch 132. The operation of the other sensors shown is the same as for FIG. 2C.

Figure 2E:
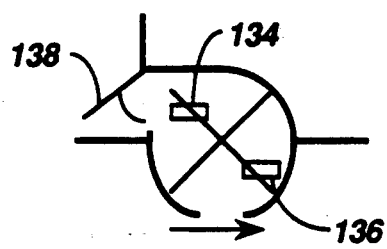
FIGS. 2E and 2F are pictorial representations showing alternate embodiments of portable communication receiver detection methods combined with security features for the on-site communication system having automatic identification capability for the preferred embodiment of the present invention.

The system for identifying pagers, in the preferred embodiment of the present invention may also be used to provide security doors which can be opened only by authorized personnel such as shown in FIG. 2E which utilizes a revolving door. As previously described, monitoring of the pager user to determine the direction, either entering or exiting the building is accomplished by the floor mounted, pressure actuated switch sensor 134, 136. Access to a secure area, such as the inside of the building, is provided only when the address of the pager user corresponds to an address stored within the terminal controlling the on-site communication system. Inside door 138 is provided with an electrically activated lock (not shown) which does not operate unless the pager user entering the building is authorized as determined by the received acknowledge back response. Such electrically activated lock systems are well known in the art.

Figure 2F:
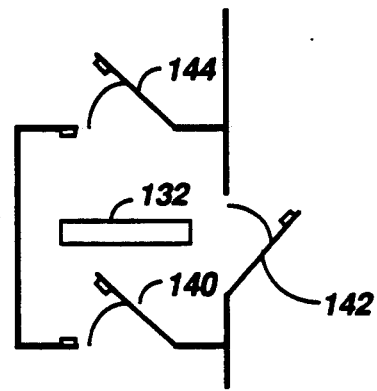

An alternate configuration of a security door is shown in FIG. 2F. As shown in FIG. 2F, an entry door 140 from the outside of the building, and an access door 142 to the inside of the building are provided. The operation of the system is as previously described for FIG. 2E. However, should the pager user fail to have the proper authorization to enter the building, the pager user must return to the outside of the building by entry door 140, or in the case entry door 140 permits only entry into the RF shielded chamber, the pager user would then exit through the exit door 144. It will be appreciated only a single entry and exit door need be provided to provide the security functions described.

In summary, the on-site communication system of the present invention having pager identification capability, can also be used to provide additional security functions to secure areas within a building.

Figure 3:
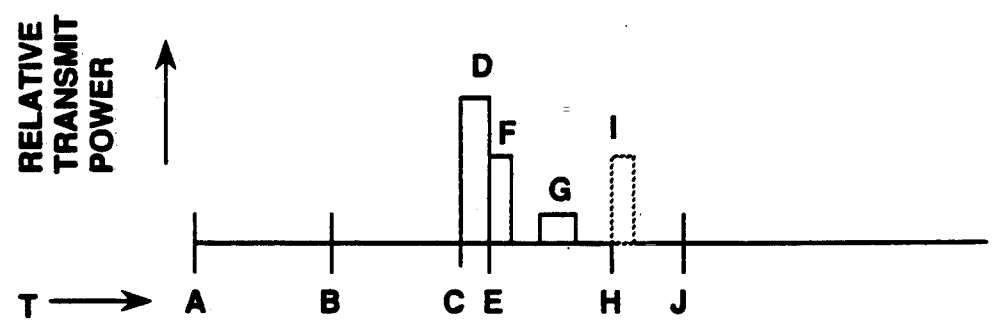
FIG. 3 is a timing diagram illustrating the operation of on-site communication system having automatic identification capability for the preferred embodiment of the present invention.

FIG. 3 shows a timing diagram illustrating the operation of the portable communication receiver identification capability of the preferred embodiment of the present invention. For purposes of discussion, the RF shielded enclosure as shown in FIG. 2D will be considered for the example to follow. The pager user opens the first door at time T=A and proceeds to enter the RF shielded chamber. From this event the system determines whether the pager user is entering or exiting the building by which door opened first. At time T=B the pager user steps across the enclosure onto the floor mounted switch, indicating the pager user is completely with the RF screened enclosure. The sensor to detect the opening of the first door, is also used to detect the closing of the first door at time T=C. Once the door closure has been detected and the presence of the pager user within the RF shielded chamber has been confirmed, the identification transmitter is keyed, transmitting the query signal (D). The query signal is transmitted for a short burst of time, such as 50-100 ms to wake up the pager, which at this time may or may not be asleep in a conventional battery saver duty cycle. At time T=E the pager has woke up, with power applied to the receiver section approximately 10-50 ms after the query signal burst. Following the short query signal burst which is transmitted at a relatively high power level of 5 watts or less, the transmitter power output in one embodiment of the present invention is dropped to a lesser value, such as up to 40 milliwatts to transmit a synchronization code word and a functional address (F), such as a group call address assigned to all pagers operating on the on-site system. This transmission is optional for operation of the preferred embodiment of the present invention, and provides security against the pager falsely responding to other high power transmissions occurring in the vicinity. When multiple on-site paging systems, as described, are located within the same geographic area, each system would be assigned a different functional address, thereby providing additional security in that a pager from one system cannot be operated in another on-site paging system, unless so authorized by being programmed to receive a second functional address corresponding to the second on-site paging system.

Once the pager has obtained synchronization with the synchronization codeword and has decoded the functional address, the pager begins transmitting the acknowledge back signal (G). Since the acknowledge back transmission is derived from the pager local oscillator, as to be described shortly, the acknowledge back transmission will be at a very low power level such as less than 10 milliwatts. After the acknowledge back signal is received, and decoded at time T=H, the acknowledge back signal is stored. When the pager includes a frequency synthesizer to allow reprogramming of the operating frequency by the identification system, as will be described in detail below, the transmitter transmits optional frequency reprogramming information (I). Such over-the-air reprogramming of the pager frequency is well known in the art using conventional paging signaling protocols. At time T=J the user has crossed the RF shielded enclosures length and opens the second door. Depending on the direction the pager user was traveling, the on-site paging system would deliver messages in a normal manner, or would store them, until the pager user is again detected entering the premises.

Figure 4:
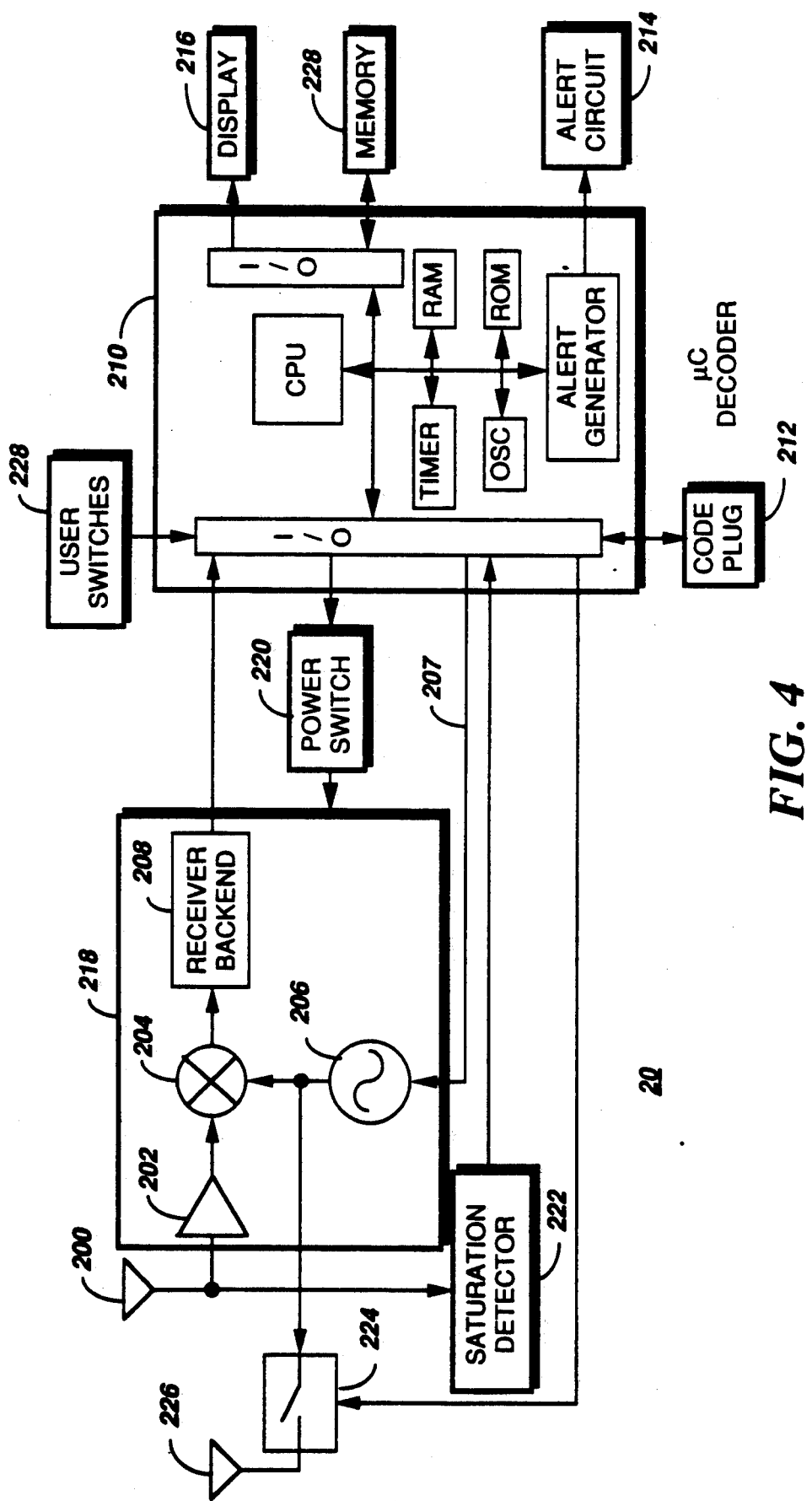
FIG. 4 is an electrical block diagram of the portable communication receiver suitable for use in the on-site communication system having automatic identification capability for the preferred embodiment of the present invention.

The pager utilized in the preferred embodiment of the present invention, is shown in FIG. 4 and is a conventional frequency modulated FM receiver which is well known in the art. The pager has been modified to receive the query signal transmitted at the same frequency as the on-site paging system, which can be transmitted while the pager is still in a sleep state during the conventional battery saver duty cycle or when the pager is awake. As shown in FIG. 4, normal on-site addresses and messages are intercepted from the on-site transmitter via antenna 200. These signals are amplified by RF amplifier 202. The output of RF amplifier 202 couples to one input of mixer 204. A local oscillator 206 output signal, which may provide either high or low side injection couples to the other input of mixer 204, resulting in an FM modulated intermediate frequency (IF) signal generated at the output of mixer 204. This IF signal is preferably at 17.9 MHz or 45 MHz depending upon the band of operation, either VHF (132-174 MHz) or UHF (430-470 MHz). It will be appreciated the receiver can be designed to operate at other frequencies as well. The IF signal is processed by the receiver backend 208 providing a stream of digital data representing the received addresses and messages, in a manner well known in the art. This stream of digital data couples to the input of a decoder, which in this instance is a microcomputer controlled decoder 210, which decodes the data stream in a manner well known in the art. Should the received address match the address of the pager stored in code plug 212, an alert is generated by alert circuit 214 after the message information has been received alerting the user of the received message. The received message can be displayed on display 216 by the user using user switches 228 in a manner well known in the art.

Power to the receiver portion 218, and most portions of the pager are controlled by the microcomputer 210 via battery saver circuit 220, which functions as a power switch, in a manner well known in the art. In normal operation pager 20 is periodically being turned on and off in a battery saver cycle consistent with the signaling format employed on the on-site paging channel.

When the pager user enters the RF shielded chamber, the query signal which is generated is received through the regular receiving antenna 200. A very high power signal relative to the normal paging signals is employed for the transmitted query signal. A saturation detector circuit 222 couples to the input of RF amplifier 202 and provides a digital output indicating the presence or absence of the strong carrier signal. Circuits performing the saturation detection function are well known in the art, generally consisting of a string of high gain amplifiers which are driven into saturation at a predetermined RF input level. In normal operation on the on-site paging system, the received carrier power on the predetermined on-site paging channel is insufficient to trigger the output of the saturation detector, thereby enabling the pager to work in a normal mode of operation. When the query signal is received, the output of the saturation detector 222 is coupled to microcomputer decoder 210, a portion of which power is maintained to control the battery saver operation of the pager. When the saturation detector output signal is applied to the microcomputer decoder 210 input, the microcomputer enables power to the receiver portion 218, even when power is disabled during the normal battery saver duty cycle. The microcomputer decoder 210 begins reading the code plug 212 for the pager address which is then applied to switch 224. The input of switch 224 couples to the output of the local oscillator 206, thereby providing a suitable carrier frequency for the transmission of the pager address information. Switch 224, which can be implemented using a field effect transistor (FET), provides simple amplitude modulation of the oscillator output which couples to antenna 226 for transmission of the address information. This address information signal is received by one of the antennas within the RF shielded chamber and processed by the controller to recover the transmitted address information. Because the acknowledge back signal is generated within the RF shielded chamber, the low oscillator power output of from 1 to 2 milliwatts is sufficient to be received for the recovery of the pager address, eliminating the requirement for a dedicated low power transmitter.

While the description of the receiver has been primarily limited to a single frequency receiver, it will be appreciated the local oscillator 206 may be replaced with a frequency synthesizer controlled by the microcomputer decoder through the microcomputer I/O line 207. The frequency synthesizer may then be reprogrammed by well known over-the-air reprogramming methods to provide operation on the on-site channel each time the pager user enters the building or premises of the on-site system, and to provide operation on a wide area channel when the pager user exits the building. Such over-the-air reprogramming is performed by the transmission of additional signaling information, after the acknowledge back signal has been received, and the identity of the pager has been determined by the system, as described in FIG. 3. When on-site and wide area operation of the pager is provided, it is contemplated that messages intended for a pager having left the building and being outside the coverage area of the on-site paging system, may be transferred to the area wide paging system, in place of being stored as previously described. It will be appreciated, that when multiple frequency operation is provided, a second receiver operating at the local oscillator frequency of the wide area paging channel may be required to receive the acknowledge back responses on the second local oscillator frequency at the wide area channel of operation, thereby allowing the pager to be identified and reprogrammed to the on-site paging system as the pager again re-enters the building. In this manner, the pager user could also move from one on-site system to another related on-site system, and maintain reliable paging transmission in each on-site system in which the pager user is located, as well as while the pager user is in transit between on-site systems. Messages originated at one on-site system would be forwarded to the alternate on-site system through the public switched telephone network.

Figure 5:
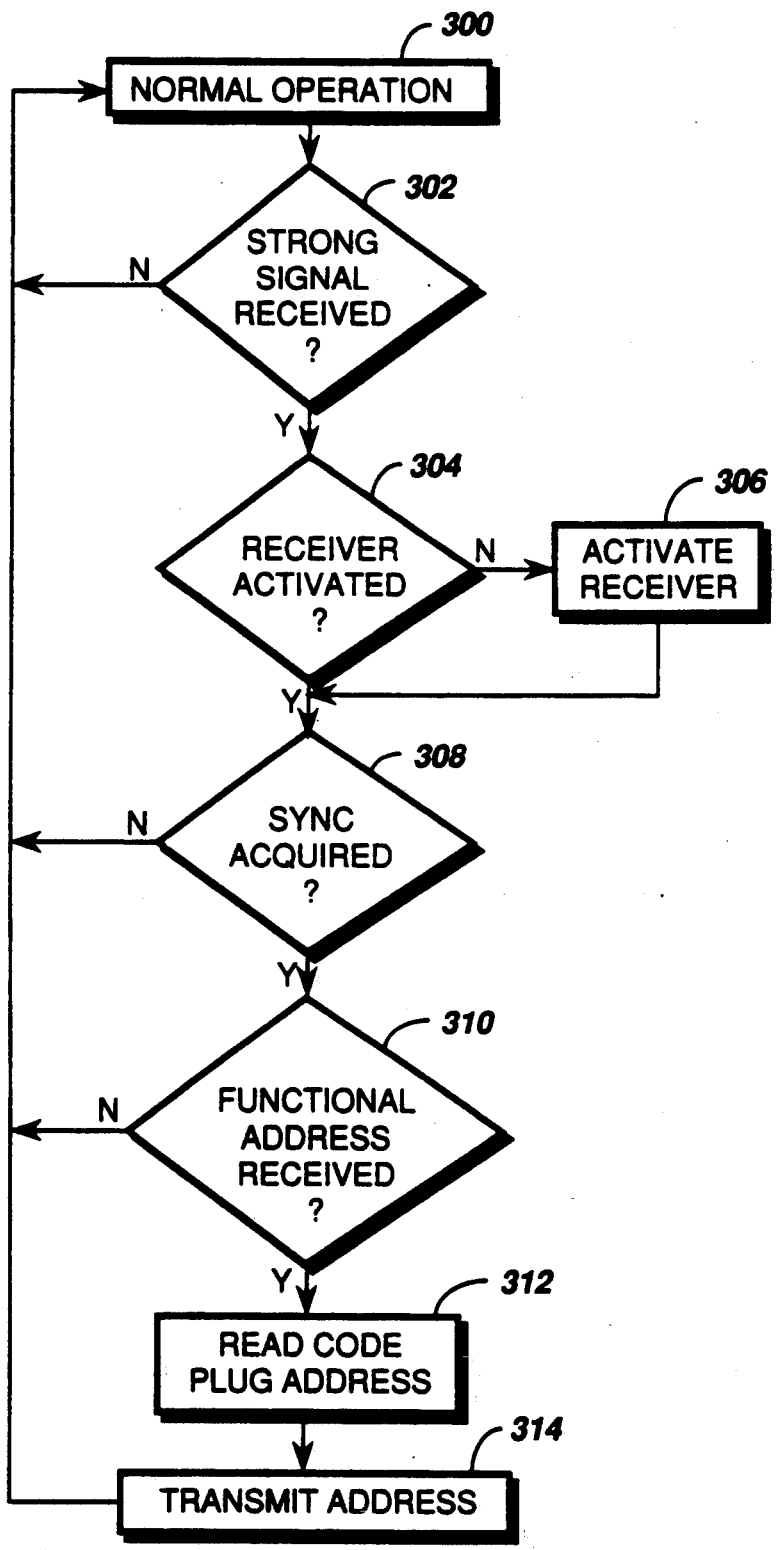
FIG. 5 is a flow chart illustrating the operation of the portable communication receiver in the on-site communication system having automatic identification capability for the preferred embodiment of the present invention.

FIG. 5 is a flow chart illustrating the operation of the portable communication receiver in the on-site communication system having automatic identification capability for the preferred embodiment of the present invention. At the time the pager user enters the RF shielded enclosure, the pager is operating in a conventional manner, at block 300, on either the on-site paging system, or when so configured for multiple frequency operation on a wide area paging system. When the high power query signal burst is detected by the saturation detector at block 302 the microcomputer decoder detects the query signal burst and checks to see if the receiver is activated, at block 304. If the receiver is not activated due to being in the sleep state of the battery saver duty cycle, the microcomputer decoder activates power to the receiver, at block 306. When the microcomputer decoder detects the receiver was activated at block 304 when the query signal burst is received, power is maintained to the receiver. When the microcomputer decoder is programmed to obtain synchronization on the transmitted synchronization code word and to decode the functional address as shown in blocks 308 and 310, the microcomputer decoder attempts to first acquire synchronization, at block 308. Should synchronization not be obtained within a predetermined time interval, the receiver returns to normal operation, at block 308. When synchronization is obtained the microcomputer decoder checks for the proper functional address, at block 310. If the correct functional address in not detected within a predetermined time interval, the receiver returns to normal operation, at block 310. When the correct functional address is decoded, at block 310, the microcomputer decoder reads the code plug address, at block 312, amplitude modulating the local oscillator output for transmitting the address, at block 314.

Figure 6:
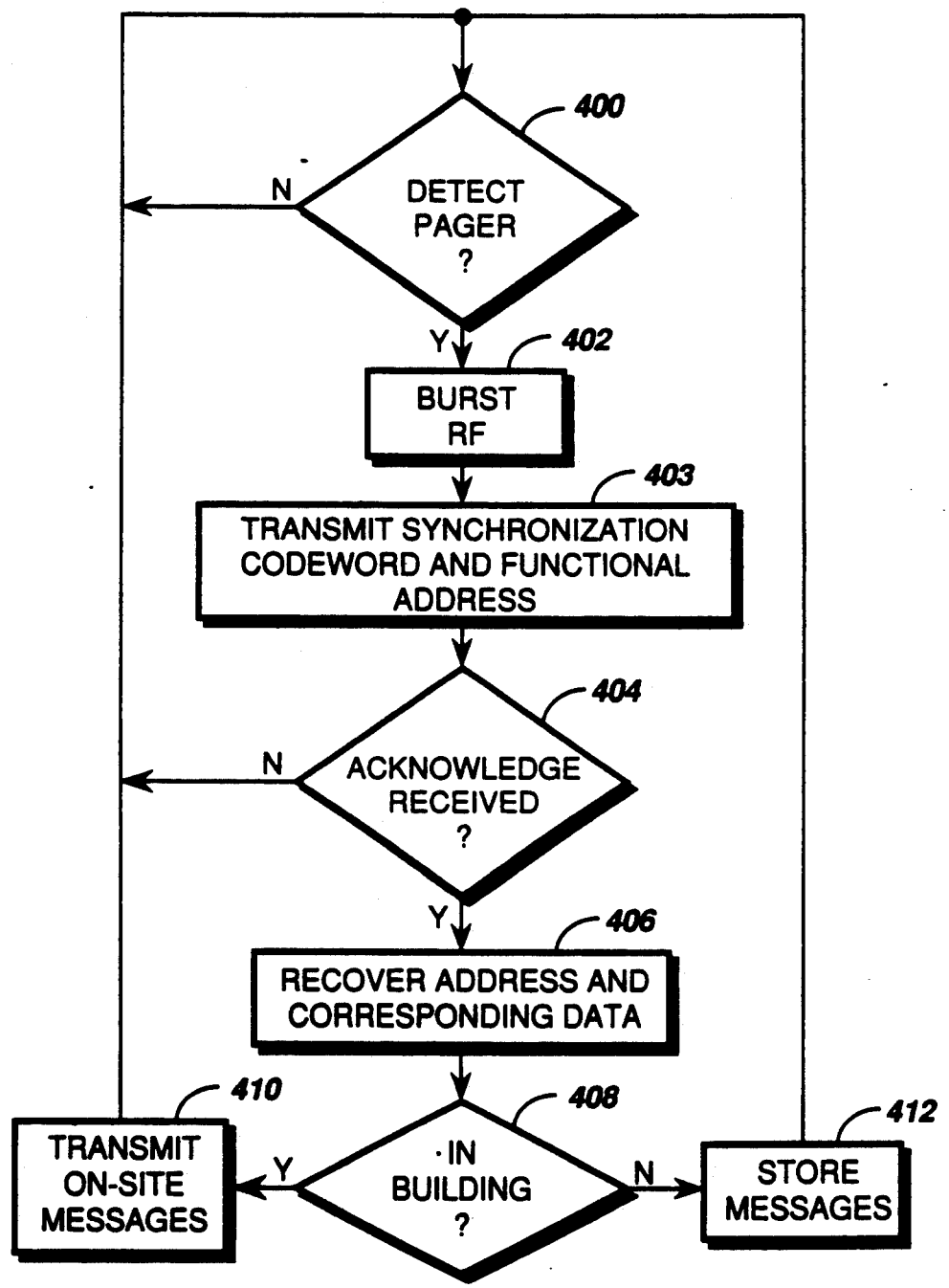
FIG. 6 is a flow chart illustrating the operation of the on-site communication system having automatic identification capability for the preferred embodiment of the present invention.

FIG. 6 is a flow chart illustrating the operation of the on-site communication system having automatic identification capability for the preferred embodiment of the present invention. The detection circuit provided at each building entrance monitors the RF shielded enclosure for the presence of a pager within the enclosure, at block 400. When a pager is detected within the RF shielded enclosure, a query signal burst is transmitted, to wake up the pager if it is currently in the sleep state of the battery saver duty cycle, at block 402. When the system is configured to transmit a functional address, the query signal transmitter power is first reduced so that a synchronization codeword can be transmitted, followed by the functional address, at block 403. If the acknowledge back signal is not received within a predetermined time interval, the system returns to monitoring the building entrances, at block 404. When the acknowledge back signal is received, at block 404, the system recovers the pager address and directional information, at block 406. When the system determines the pager is entering the building, at block 408, messages are transmitted normally on the on-site paging system. When the system determines the pager is leaving the building, at block 408, messages intended for the pager leaving the building are stored until the pager user reenters the building, at block 412.

While specific embodiments of this invention have been shown and described, further modifications and improvements will occur to those skilled in the art. All modifications which retain the basic underlying principles disclosed and claimed herein, are within the scope and spirit of the present invention.

I claim:

1. In an on-site communication system including an on-site transmitter for transmitting, on a predetermined frequency within a predetermined coverage area, messages to a plurality of portable communication receivers, the portable communication receivers including acknowledge back response capability, a system for the identification of the portable communication receivers comprises:

entry means, for allowing access into the predetermined coverage area, said entry means including RF shielding means for shielding the portable communication receivers located therein from the message transmissions by the on-site transmitter;

detector means, coupled to said entry means for detecting the presence of the portable communication receivers within said entry means;

identification transmitter means, coupled to said detector means, for transmitting within said RF shielding means a query signal on the predetermined frequency in response to one of the plurality of portable communication receivers being detected within said entry means; and identification receiver means, coupled to said entry means, for receiving an acknowledge back signal transmitted by the portable communication receiver located within said RF shielding means in response to the query signal being transmitted, the received acknowledge back signal providing identification of the portable communication receiver entering said entry means.

2. The identification system according to claim 1, wherein the acknowledge back signal is encoded with an address identifying each of the plurality of portable communication receivers.

3. The identification system according to claim 2, further comprising:

memory means; and terminal means, for receiving and processing messages intended for transmission by the on-site transmitter to the plurality of portable communication receivers, said terminal means being coupled to said memory means and to said identification receiver means, and further responsive to the received acknowledge back signal, for effecting the storage of the addresses identifying the portable communication receivers entering said entry means.

4. The identification system according to claim 3, wherein said detector means comprises direction indicating means, located within said entry means, for generating direction signals providing information indicating ingress into and egress from the predetermined coverage area of the on-site communication system by each of the plurality of portable communication receivers, said terminal means being coupled to said detector means and further responsive to the direction signals for effecting the storage of the information indicating ingress into and egress from the predetermined coverage area for each of the plurality of portable communication receivers.

5. The identification system according to claim 4 wherein said terminal means is responsive to the stored egress information for the portable communication receivers, for enabling the storage of messages intended for the portable communication receivers into said memory means, and further wherein said terminal means is responsive to the stored ingress information for the portable communication receivers, for enabling the transmission of the stored messages intended for the portable communication receivers by the on-site transmitter.

6. The identification system according to claim 1 wherein the portable communication receivers include a local oscillator operating at a predetermined frequency, and wherein the portable communication receivers transmit the acknowledge back signal on the predetermined local oscillator frequency.

7. The identification system according to claim 4 wherein the portable communication receivers further comprise a frequency synthesizer for generating at least two local oscillator frequencies, and wherein said terminal means includes means for generating programming information which is transmitted by said identification transmitter means when the portable communication receiver is located within said RF shielding means for programming said programmable frequency synthesizer to one of the at least two local oscillator frequencies in response to the direction signal received and stored.

8. An identification system, for use in an on-site communication system having a predetermined coverage area, and including an on-site transmitter operating on a predetermined frequency for the transmission of messages, said identification system comprising:

a portable communication receiver having acknowledge back response capability, for receiving the messages transmitted by the on-site transmitter;

entry means, for allowing access into the predetermined coverage area, said entry means including RF shielding means for shielding said portable communication receiver located therein from the message transmissions by the on-site transmitter;

detector means, coupled to said entry means, for detecting the presence of said portable communication receiver within said entry means;

identification transmitter means, coupled to said detector means, for transmitting, within said RF shielding means, a query signal in response to said portable communication receiver being detected within said entry means; and identification receiver means, coupled to said entry means, for receiving an acknowledge back signal transmitted by said portable communication receiver located within said RF shielding means in response to the query signal being transmitted, the received acknowledge back signal providing identification of said portable communication receiver entering said entry means.

9. The identification system according to claim 8, wherein said portable communication receiver includes code memory means for storing an address to which said portable communication receiver is responsive for receiving the messages transmitted by the on-site transmitter, and wherein the acknowledge back signal transmitted by said portable communication receiver is encoded with the stored receiver address.

10. The identification system according to claim 9, further comprising:

memory means; and terminal means, for receiving and processing messages intended for transmission by the on-site transmitter to the plurality of portable communication receivers, said terminal means being coupled to said memory means and to said identification receiver means, and further responsive to the received acknowledge back signal, for effecting the storage of the address identifying said portable communication receiver entering said entry means.

11. The identification system according to claim 10, wherein said detector means comprises direction indicating means, located within said entry means, for generating a direction signal providing information indicating ingress into and egress from the predetermined coverage area provided by the on-site communication system by the portable communication receiver, said terminal means being coupled to said detector means and further responsive to the direction signal for effecting the storage of the information indicating ingress into or egress from the predetermined coverage area by the portable communication receiver.

12. The identification system according to claim 11 wherein said terminal means is responsive to the stored egress information, for enabling the storage of the messages intended for said portable communication receiver into said memory means, and further wherein said terminal means is responsive to the stored ingress information for enabling the transmission of the stored messages intended for said portable communication receiver by the on-site transmitter.

13. The identification system according to claim 8 wherein said portable communication receiver includes a local oscillator operating at a predetermined frequency, and wherein said portable communication receiver transmits the acknowledge back signal on the predetermined local oscillator frequency.

14. The identification system according to claim 11 wherein said portable communication receiver comprises a programmable frequency synthesizer for generating at least two local oscillator frequencies, and wherein said terminal means includes means for generating programming information which is transmitted by said identification transmitter means when the portable communication receiver is located within said RF shielding means for programming said programmable frequency synthesizer to one of the at least two local oscillator frequencies in response to the direction signals received and stored.

15. A method for identifying a portable communication receiver having acknowledge back response capability which operates in a communication system having an on-site transmitter operating on a predetermined frequency for providing on-site system coverage within a predetermined coverage area, said method comprising the steps of:

providing entry means for access into the on-site coverage area, the entry means including RF shielding means for shielding the portable communication receiver from the message transmissions by the on-site transmitter;

detecting the presence of the portable communication receiver within the entry means;

transmitting within the RF shielding means a query signal on the predetermined frequency in response to the portable communication receiver being detected within the entry means; and receiving within the RF shielding means an acknowledge back signal transmitted by the portable communication receiver in response to the transmitted query signal, the received acknowledge back signal providing identification of the portable communication receiver entering said entry means.

16. The method for identifying a portable communication receiver according to claim 15, said method further comprising the step of storing an indication of the portable communication receiver having entered the entry means in response to the acknowledge back signal being generated.

17. The method for identifying a portable communication receiver according to claim 16, said method further comprising the steps of:

generating a direction signal providing information indicating ingress into and egress from the coverage area provided by the on-site communication system by the portable communication receiver; and storing the information indicating ingress into and egress from the coverage area provided by the on-site communication system in response to the directional signal being generated.

18. The method for identifying a portable communication receiver according to claim 15, said method further comprising the steps of:

storing messages intended for the portable communication receiver, when the information stored indicates egress from the coverage area provided by the on-site communication system; and transmitting, by the on-site transmitter, the stored messages intended for the portable communication receiver, when the information stored indicates ingress into the coverage area provided by the on-site communication system.

19. The method for identifying a portable communication receiver according to claim 17, wherein the portable communication receiver includes a programmable frequency synthesizer for generating at least two local oscillator frequencies, said method further comprising the steps of:

generating programming information for programming the programmable frequency synthesizer in response to the direction signals received and stored; and transmitting within the RF shielding means the programming information to effect the selection of one of the at least two local oscillator frequencies.

* * * * *